United States Patent Office 3,375,272
Patented Mar. 26, 1968

3,375,272
PRODUCTION OF DIETHYLADIPIC ACID
Walter K. Henle, Orinda, Calif., assignor to Shell Oil Company, New York, N.Y., a corporation of Delaware
No Drawing. Filed May 29, 1964, Ser. No. 371,185
2 Claims. (Cl. 260—537)

ABSTRACT OF THE DISCLOSURE

Reaction of dialkali metal 1,3-alkadiene linear dimer, e.g., disodiooctadiene, with an essentially stoichiometric amount of a non-variable valence polyvalent metal halide $MR_n$, where M is magnesium or aluminum, $n$ is the valence 2 to 3 of M, and at least one R is halogen and any non-halogen R is hydrocarbyl, e.g. magnesium bromide, dissolved in an inert solvent, e.g., ether, produces the corresponding 3,6-metalooctadiene, and carbonation of the product produces the metal salt of a 2,2′-dialkenyl-substituted adipic acid, from which upon hydrogenation followed by hydrolysis is obtained 2,2′-dialkyladipic acid.

---

This invention relates to an improved process for the preparation of dicarboxylic acids from dienes. More particularly, it relates to the preparation of 2,2′-diethyladipic acid from 1,3-butadiene.

The preparation of di-functional organometallic compounds by the dimerization of conjugated diolefins in the presence of an alkali metal, e.g., sodium or potassium, to form dialkali metal polyenes is already known; see, e.g., U.S. 2,352,461, U.S. 2,773,092, U.S. 2,816,916 and U.S. 2,816,936. It is also known to subject disodiooctadiene (from butadiene) to carbonation hydrogenation and hydrolysis to produce $C_{10}$ dicarboxylic acids, including about 10% of 2,2′-diethyladipic acid; see, e.g., U.S. 2,816,916. Furthermore, U.S. 2,795,625 discloses that by reacting disodiooctadiene with solid magnesium chloride corresponding bis-chloromagnesio-octadiene is formed which yields the desirable 2,2′-diethyladipic acid in an amount of of about 30%.

It is a principal object of the present invention to provide an efficient and economical method for converting disodiooctadiene more selectively to 2,2′-diethyladipic acid. A further object is to provide a process for the selective preparation of 3,6-magnesio-1,7-octadiene.

These objects will be more fully understood and others will be apparent from the description of the invention.

Now, in accordance with this invention, it has been found that by reacting dialkali metal 1,3-alkadiene linear dimer with an essentailly stoichiometric amount of a non-variable valence polyvalent metal halide $MR_n$ ($n$ is the valence 2 to 3 of metal M and at least one R is halogen and any non-halogen R is hydrocarbyl), essentially completely dissolved in an inert solvent, the corresponding 3,6-metalooctadiene is selectively produced, and carbonation thereof to the corresponding metal polyhydrocarbyl adipate followed by hydrogenation of the resulting dicarboxylate yields essentially exclusively polyalkyl adipate salt which is hydrolyzed to corresponding polyalkyladipic acid. More specifically, disodiooctadiene (from dimerization of butadiene with sodium) reacts with magnesium or aluminum halide, preferably middle halide, including lower hydrocarbyl magnesium or hydrocarbylaluminum halide, e.g., magnesium bromide, ethylmagnesium bromide, aluminum chloride, ethylaluminum dichloride and diethylaluminum chloride, dissolved in an inert solvent to form selectively 3,6-metalo-1,7-octadiene, which is carbonated to the corresponding metal 2,2′-divinyladipate. The latter product can be hydrogenated to the metal 2,2′- diethyladipate, which, upon acidification yields 2,2′-diethyladipic acid. Acidification of the metal (e.g., Mg) 2,2′-divinyladipate yields 2,2′-divinyladipic acid in high yield.

Although the exact nature of the reactions involved is not completely understood, it is proposed that the following incomplete equation is representative:

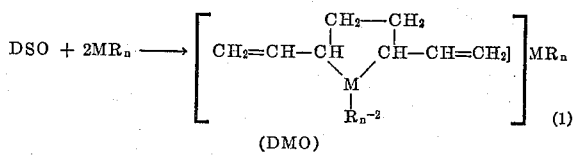
(DMO)

The metal halide compound includes those of polyvalent metals wherein the valence state is a whole number from 2 to 3. Suitable halides are those of metals forming metal-carbon bonds which react with carbon dioxide, i.e., metal-carbon bonds which can be carboxylated, and, in particular, metals of Groups II and III of the Periodic Table of Elements having an atomic number of from 12 to 13. Compounds which have been found especially useful in this reaction are those containing magnesium. The metal can be combined with only halogen, e.g., magnesium bromide, or can be an organometal halide such as a Grignard reagent. The halogen metal, as previously described, is preferably a halogen having an atomic number of from 17 to 35, i.e., a middle halogen—chlorine and bromine. Compounds which are represented by the general formula $MR_n$ include, for example, aluminum chloride, diethylaluminum chloride, magnesium bromide, magnesium chloride, phenylmagnesium iodide, cyclopentylmagnesium bromide and methylmagnesium bromide.

Although either sodium or potassium, i.e., an alkali metal with an atomic number of 11 to 19, inclusive, is useful as the alkali metal reactant, the use of sodium is preferred since sodium gives excellent selectivity in yields of dimerized products, and it is cheaper and more readily available. Mixtures of halides of different metals, especially of sodium and potassium and of sodium and calcium can also be used.

The dialkali metal polyene can be prepared by any of the known methods, as fully described in the above-mentioned patents. However, merely for purposes of illustration, the following specific preparation of disodiooctadiene is included.

The preparation of DSO in a batch operation was performed in an attritor assembly containing 400 milliliters of ¼-inch diameter stainless steel balls. The assembly was placed overnight in a nitrogen-purged dry box. One-half mole of high surface sodium on sodium chloride carrier was transferred into the attitor while lines for the transfer of liquid and gases were secured to the reactor. Purging of the system with nitrogen was continued and maintained throughout the reaction. The attritor vessel was cooled and maintained at −70° C. in an isopropanol-$CO_2$ bath, and then 1 liter of purified and distilled dimethyl ether was pumped into the attritor under nitrogen pressure. One-half mole of butadiene, stored in a trap at −20° C., was carried as vapor with a nitrogen stream within one hour into the reaction stream. After the addition of butadiene, the $CO_2$-isopropanol bath was removed from the reactor.

The invention is predicated on the discovery that the metal halide compound must be dissolved in solvent, preferably an inert solvent. By inert solvent is meant a solvent which is inactive or of a low reactivity with either the dialkali metal octadiene or metal halide compound and additionally one in which the metal halide compound has a substantial solubility. By substantial solubility is meant a sufficient percentage, i.e., grams of metal halide per milliliters of solvent, so that the reaction can be carried out without requiring that a prohibitively large amount of solvent be present. The solubility will be dependent on a number of factors including metal halide involved, the specific solvent and temperature at which the solution is formed. But for practical purposes, the solvent should be such that the metal halide should be at least 10% soluble in the solvent at room temperature, i.e., 20° C. Solvents satisfying these criteria include ethers, saturated hydrocarbons and unsubstituted aromatics, the preferred solvent being a lower aliphatic ether, including diethers, especially dialkyl ethers of from 2 to 8 carbon atoms, e.g., diethyl ether. Other ethers which are particularly useful as solvents include dimethyl ether, dimethoxyethane, tetrahydrofuran and dimethoxyethyl ether.

Of course, not all of the above solvents will be effective for each and every one of the metal halides encompassed by this invention, e.g., the organic metal halides will be more soluble in hydrocarbons than the other metal halides.

Although smaller proportions can be used, at least a stoichiometric amount of metal halide compound is needed for complete reaction of the disodiooctadiene. A slight excess over the stoichiometric amount, up to 2 moles of metal halide compound per mole of disodiooctadiene is advantageous with an excess of about 10% mole being preferred. The amount of solvent necessary to dissolve all the metal halide compound will depend of course on the specific compound being used and the particular solvent employed. Any concentration up to and including a 50% weight solution will usually be satisfactory, especially 5–30% weight, with a 10% weight solution being highly advantageous.

The selectivity for the 3,6-metalooctadiene results by virtue of the polyvalent metal halide being in solution so that it may react, i.e., that the metal halide in solution produces the desired 3,6-metalooctadiene. Of course, excess metal halide can be present, i.e., more than will dissolve in the solvent at the specific temperature involved. Under these conditions, the solution will continue to be saturated even though the dissolved metal halide is reacting. Furthermore, an excess of dialkali metal-1,3-alkadiene linear dimer can be utilized when it is not desirable for the reaction to go completely to the corresponding 3,6-metalooctadiene.

Typical reaction time required for the dimerization of the 1,3-butadiene to DSO is about 1 hour per mole, while the reaction of the DSO and the metal halide compound is practically instantaneous and at the most only a few minutes time is required. The reaction between DSO and the metal halide compound is usually performed in a period of 5 to 20 minutes. Therefore, the DSO can be formed in the presence of the metal halide, with resultant formation of the metal octadiene (DMO) in situ, the rate determining reaction being the dimerization of the 1,3-butadiene. For practical purposes the range of time for the in situ reaction would be from 1 hour to 3 hours.

Although any order of mixing the reactants, may be used, it is preferred to add slowly a dispersion of DSO in a solvent such as dimethyl ether, with stirring, to an ether solution of the metal halide compound. Best results are obtained where the reactants are retained in ice-water bath, wherein the temperature is kept below the boiling point of the solvent. The rapid metallative exchange reaction can be followed by carbonation with Dry Ice, hydrogenation and hydrolysis to 2,2'-diethyladipic acid. The carbonation may be done by subjecting the 3,6-metalooctadiene to dry gaseous carbon dioxide, by contact with solid carbon dioxide or by means of a solution of carbon dioxide. The hydrogenation is a conventional step utilizing well known catalytic materials and can be performed either prior to or subsequent to the acidification. If it is desirable to obtain the unsaturated $C_{10}$ dicarboxylic acid, the hydrogenation step can be left out.

The following examples illustrate the application of the invention, but are not to be construed as limiting the invention to the particular details thereof.

One-eighth mole of DSO on 75 grams of NaCl suspended in 500 milliliters of dimethyl ether was added slowly at —30° C. to an agitated solution of one-fourth mole of magnesium bromide dissolved in 2 liters of diethyl ether at —20° C. (supersaturated). An instantaneous color change occurred with the formation of a soluble magnesium octadiene compound. The mixture was warmed to room temperature by standing while the dimethyl ether volatilized. The resulting magnesium octadiene was soluble in the remaining diethyl ether. The reaction mixture was carbonated by adding $CO_2$ (Dry Ice) thereto and then catalytically hydrogenated in liquid phase in the presence of a palladium on carbon catalyst. Upon acidification, 22 grams of 2,2'-diethyladipic acid was formed.

Carbonation, hydrogenation and acidification of the reaction product of DSO with methyl magnesium bromide and diethyl aluminum chloride gave similar selectivity.

I claim as my invention:

1. A process for preparing 2,2'-diethyladipic acid by reacting disodiooctadiene suspended in dimethyl ether with a stoichiometric amount of magnesium bromide dissolved in diethyl ether, removing the dimethyl ether by volatilization at room temperature, and thereafter subjecting the intermediate reaction product to carbonation with solid carbon dioxide, hydrogenation in the liquid phase over a hydrogenation catalyst and acidification whereby the $C_{10}$ carboxylic acid, 2,2'-diethyladipic acid is selectively formed.

2. A process in accordance with claim 1 wherein the disodiooctadiene is reacted at —20° C. with magnesium bromide in the proportion of 2 mols of magnesium bromide dissolved in diethyl ether for each mol of disodiooctadiene present and wherein the 2,2'-diethyladipic acid is recovered in a yield of 87%.

References Cited

UNITED STATES PATENTS 2,795,625  6/1957  Nobis et al. _____ 260—533

LORRAINE A. WEINBERGER, *Primary Examiner.*

V. GARNER, *Examiner.*